United States Patent Office 3,055,908
Patented Sept. 25, 1962

3,055,908
THIAZOLYLTHIONAPHTHOQUINONES
John J. D'Amico, Charleston, W. Va., assignor to Monsanto Chemical Company, St. Louis, Mo., a corporation of Delaware
No Drawing. Filed Dec. 15, 1960, Ser. No. 75,918
6 Claims. (Cl. 260—302)

The present invention relates to new compositions of matter. More particularly it relates to thiazolylthio-1,4-naphthoquinones and to methods for producing them.
The compounds of this invention possess the structure

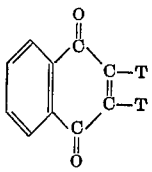

where T represents thiazolylthio. These compounds may be prepared by reacting a mercaptothiazole, conveniently in aqueous alkaline solution, with 2,3 - dichloro - 1,4-naphthoquinone. Suitable mercaptothiazoles include 2-mercaptobenzothiazole,
2-mercapto-5-chlorobenzothiazole,
2-mercapto-6-ethoxybenzothiazole,
2-mercapto-4-ethylbenzothiazole,
2-mercapto-4,5-dimethylbenzothiazole,
2-mercapto-4-methylbenzothiazole,
2-mercapto-4-phenylbenzothiazole,
2-mercapto-6-methylbenzothiazole,
2-mercapto-6,7-dihydro-4,5-benzobenzothiazole,
mercaptobenzoxazole,
4-methyl-2-mercaptothiazole,
4-ethyl-2-mercaptothiazole and other lower alkyl 2-mercaptothiazoles.

As exemplary of the invention, the following are illustrative but are not to be construed as limitative thereof.

Example 1

In to a stirred mixture of 34.3 grams (0.2 mole) of 97% 2-mercaptobenzothiazole, 400 ml. of acetone and 13.2 grams (0.2 mole) of 85% potassium hydroxide there was added 23.7 grams (0.1 mole) of 2,3-dichloro-1,4-naphthoquinone. The stirred reaction mixture was then heated at 50–60° C. for 4 hours and thereafter added to 1500 grams of ice-water. The reaction mixture was stirred for 15 minutes, filtered, the precipitate washed with water until neutral to litmus and air dried at 25–30° C. The 2,3-bis(2-benzothiazolylthio)-1,4-naphthoquinone wase obtained as a reddish-brown solid in 96.5% yield. After recrystallization from benzene it melted at 161–162° C. Analysis gave 5.6% nitrogen and 25.9% sulfur as compared to 5.7% nitrogen and 26.2% sulfur calculated for $C_{24}H_{12}N_2O_2S_4$.

Example 2

In the foregoing procedure, 40.2 grams (0.2 mole) of 2-mercapto-5-chlorobenzothiazole was substituted for the 2-mercaptobenzothiazole. A yield of 95.2% of 2,3-bis(5-chloro-2-benzothiazolylthio)-1,4-naphthoquinone was obtained. The reddish-brown solid melted at 223–225° C. after recrystallization from benzene. Analysis gave 5.3% nitrogen and 23.2% sulfur as compared to 5.0% nitrogen and 23.0% sulfur calculated for $C_{24}H_{10}Cl_2N_2O_2S_4$.

Example 3

In the procedure of Example 1, 42.2 grams (0.2 mole) of 2-mercapto-6-ethoxybenzothiazole was substituted for the 2-mercaptobenzothiazole. The 2,3-bis(6-ethoxy-2-benzothiazolylthio)-1,4-naphthoquinone, obtained in 97% yield, was a reddish-brown solid melting at 148–149° C. after recrystallization from benzene. Analysis gave 4.6% nitrogen and 22.1% sulfur as compared to 4.9% nitrogen and 22.2% sulfur calculated for $C_{28}H_{20}N_2O_4S_4$.

Example 4

Substituting 26.3 grams (0.2 mole) of 4-methyl-2-mercaptothiazole for 2-mercaptobenzothiazole in Example 1 and isolating the product as described, 2,3-bis(4-methyl-2-thiazolylthio)-1,4-naphthoquinone was obtained in 76.9% yield as a brown solid melting at 113–116° C.

Example 5

Again proceeding as in Example 1, 30.2 grams (0.2 mole) of mercaptobenzoxazole was substituted for 2-mercaptobenzothiazole. 2,3-bis(2-benzoxazolylthio)-1,4-naphthoquinone was obtained in 85% yield as a brown solid melting at 140–142° C. Analysis gave 5.5% nitrogen and 14.1% sulfur compared to 6.1% nitrogen and 14.1% sulfur calculated for $C_{24}H_{12}N_2O_4S_2$. This compound accelerates the vulcanization of rubber.

The compounds of this invention contain reactive keto groups and are useful intermediates. They are also useful for accelerating vulcanization of sulfur vulcanizable elastomers, as for example styrene-butadiene copolymer rubber, synthetic polyisoprene, polybutadiene and natural rubbers. As illustrative of accelerating properties, the following rubber stocks were compounded:

| Stock | A | B | C | D[1] |
|---|---|---|---|---|
| | Parts by weight | | | |
| Smoked sheets | 100 | 100 | 100 | 100 |
| Carbon black | 50 | 50 | 50 | 50 |
| Zinc oxide | 5 | 5 | 5 | 5 |
| Stearic acid | 3 | 3 | 3 | 3 |
| Saturated hydrocarbon softener | 3 | 3 | 3 | 3 |
| Sulfur | 3 | 3 | 3 | 3 |
| Product of Example 1 | 2.5 | 2.5 | 2.5 | 2.5 |
| Product of Example 2 | 1.0 | | | |
| Product of Example 3 | | 1.0 | | |
| Product of Example 4 | | | 1.0 | |
| | | | | 1.0 |

[1] This stock also contained 1.0 part of antioxidant.

The compositions were cured by heating in a press for different periods of time at 144° C. The physical properties exhibited by the stocks at optimum cure were as follows:

TABLE I

| Stock | Modulus of Elasticity in lbs./in.$^2$ at 300% Elongation | Tensile at Break in lbs./in.$^2$ |
|---|---|---|
| A | 1,880 | 3,340 |
| B | 1,970 | 3,220 |
| C | 1,720 | 3,120 |
| D | 1,300 | 2,700 |

It is intended to cover all changes and modifications of the examples of the invention herein chosen for purposes of disclosure which do not constitute departures from the spirit and scope of the invention.

This application is a continuation-in-part of copending application Serial No. 854,533, filed November 23, 1959, now abandoned.

What is claimed is:
1. A compound of the formula

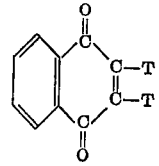

where T is selected from the group consisting of benzothiazolylthio, monochloro-, monoloweralkoxy-, monoloweralkyl-, diloweralkyl- and monophenyl-benzothiazolylthio, 6,7 - dihydro - 4,5 - benzobenzothiazolylthio, benzoxazolylthio and 4-loweralkylthiazolylthio.

2. 2,3-bis(2-benzothiazolylthio)-1,4-naphthoquinone.
3. 2,3 - bis(5 - chloro - 2 - benzothiazolylthio) - 1,4-naphthoquinone.
4. 2,3 - bis(6 - ethoxy - 2 - benzothiazolylthio) - 1,4-naphthoquinone.
5. 2,3-bis(2-benzoxazolylthio)-1,4-naphthoquinone.
6. 2,3 - bis(4 - methyl - 2 - thiazolylthio) - 1,4 - naphthoquinone.

References Cited in the file of this patent

UNITED STATES PATENTS 2,616,893    Newby _____ Nov. 4, 1952

FOREIGN PATENTS 485,322    Germany _____ Nov. 1, 1929